United States Patent [19]

Asprey et al.

[11] Patent Number: 4,724,127

[45] Date of Patent: Feb. 9, 1988

[54] METHOD FOR RECOVERY OF ACTINIDES FROM REFRACTORY OXIDES THEREOF USING $O_2F_2$

[75] Inventors: Larned B. Asprey; Phillip G. Eller, both of Los Alamos, N. Mex.

[73] Assignee: The United States of America as represented by the United States Department of Energy, Washington, D.C.

[21] Appl. No.: 16,483

[22] Filed: Feb. 17, 1987

Related U.S. Application Data

[63] Continuation of Ser. No. 649,626, Sep. 12, 1984, abandoned.

[51] Int. Cl.⁴ .................... C01G 50/00; C01G 43/06; C01F 15/00
[52] U.S. Cl. ........................ 423/19; 423/250; 423/251; 423/258; 423/252
[58] Field of Search ............... 423/19, 250, 252, 251, 423/258

[56] References Cited

U.S. PATENT DOCUMENTS

| | | |
|---|---|---|
| 2,893,826 | 7/1959 | Malm et al. ............... 423/251 |
| 3,383,183 | 5/1968 | Grant ....................... 423/19 |
| 3,753,920 | 8/1973 | Anastasia et al. ........... 423/19 |
| 4,038,374 | 7/1977 | Christe ..................... 149/1 |
| 4,172,114 | 10/1979 | Tsujino et al. .............. 423/251 |
| 4,193,261 | 3/1980 | English ..................... 149/1 |
| 4,421,727 | 12/1983 | Wilson et al. ............... 423/19 |
| 4,522,794 | 6/1985 | Hochel et al. ............... 423/251 |

OTHER PUBLICATIONS

Artiukhov et al., "Synthesis and Reactivity of Dioxodifluoride", 2 pp., *Summary of Reports*, Fifth all Union Symposium on the Chemistry of Inorganic Fluorides, held at Dnepropetrovsk, 27-30 Jun. 1978, publ. by "Nauka", (1978), Moscow.

Cleveland, *The Chemistry of Plutonium*, pp. 339-349, Gordon and Breach Science Publ., (1970), New York, QD 181.P9.C5.

Bailar et al., *Comprehensive Inorganic Chemistry*, 2, pp. 747 and 752-756, Pergamoa Press, (1973), Oxford, QD 151.2.C6.

*Primary Examiner*—Edward A. Miller
*Attorney, Agent, or Firm*—Samuel M. Freund; Paul D. Gaetjens; Judson R. Hightower

[57] ABSTRACT

Method for recovery of actinides from nuclear waste material containing sintered and other oxides thereof using $O_2F_2$ to generate the hexafluorides of the actinides present therein. The fluorinating agent, $O_2F_2$, has been observed to perform the above-described tasks at sufficiently low temperatures that there is virtually no damage to the containment vessels. Moreover, the resulting actinide hexafluorides are not destroyed by high temperature reactions with the walls of the reaction vessel. Dioxygen difluoride is readily prepared, stored and transferred to the place of reaction.

7 Claims, No Drawings

METHOD FOR RECOVERY OF ACTINIDES FROM REFRACTORY OXIDES THEREOF USING $O_2F_2$

This is a continuation of application Ser. No. 649,626 filed Sept. 12, 1984, now abandoned.

BACKGROUND OF THE INVENTION

The present invention relates generally to methods of fluorination and, more particularly, to the use of $O_2F_2$ for the extraction of actinides from sintered and other oxides, and from waste nuclear materials containing the actinides by producing therefrom the hexafluorides of the actinides present or soluble actinide compounds thereof. This invention is the result of a contract with the Department of Energy (Contract No. W-7405-ENG-36).

Fluorinating agents useful for recovering actinides as volatile hexafluorides from refractory oxides, scrap material and from incinerator ash, are known. However, the difficulty with all of the known materials which are capable of performing these tasks is that little reaction takes place at or below room temperature. The requisite high temperatures and harsh oxidizing environments result in the deterioration of any containment vessels and transfer equipment as well as in the destruction of the intended end products, the actinide hexafluorides themselves. Moreover, the reaction of a fluorinating agent with every warm surface in its pathway makes it very difficult to introduce the fluorinating agent into the region of interest.

Dioxygen difluoride was first prepared and isolated in 1933. A careful investigation of the properties of this material was performed by A. G. Streng in his article entitled "The Oxygen Fluorides" published in Chem. Rev. 63, 607 (1963), the disclosure therein hereby being incorporated by reference herein. Of particular interest in this article is the mention by the auther of the explosive reaction of $O_2F_2$ when placed in contact with a sheet of platinum covered with platinum fluoride at 160° K. Even at this low temperature, it would appear that $O_2F_2$ is unstable in the presence of metallic surfaces. The use of this material then for recovering actinides from refractory oxide actinide containing compounds or from incinerator ash which are located inside metal vessels would appear to be impossible especially if the $O_2F_2$ had to be first introduced into the region of interest through metallic plumbing.

The inventors wish to point out that the use of $O_2F_2$ for the fluorination of actinide fluorides and oxyfluorides thereof is the subject matter for copending patent application Ser. No. 636,656. "Method For Fluorination Of Actinide Fluorides And Oxyfluorides Thereof Using $O_2F_2$," filed on Aug. 1, 1984 by Phillip G. Eller et al.

SUMMARY OF THE INVENTION

The principal object of the subject invention is to provide a method for recovering actinides in the form of their respective hexafluorides from oxides thereof.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the method of this invention includes contacting the sintered oxide material, from which actinides are to be recovered in the form of their respective hexafluorides, with $O_2F_2$ for a time period sufficient to obtain substantial reaction between the sintered oxide material removing the products of the reaction from the reaction region, and collecting the respective hexafluorides of the actinides present. Preferably, the fluorination step is performed at temperatures below approximately 20° C. More specifically the fluorination step is preferably performed in the temperature range between about −80° and 20° C. The $O_2F_2$ may be used either in a batch or flowing mode in the fluorination step.

In a further aspect of the present invention, in accordance with its objects and purposes, the method hereof includes contacting the sintered oxide material, from which actinides are to be recovered in the form of their respective hexafluorides, with a fluorinating agent which consists essentially of $O_2F_2$ for a time period sufficient to obtain substantial reaction between the sintered oxide material, removing the products of the reaction from the reaction region, and collecting the respective hexafluorides of the actinides present. Preferably, the fluorination step is performed at temperatures below approximately 20° C. More specifically, the fluorination step is preferably performed in the temperature range between about −80° and 20° C. The $O_2F_2$ may be used either in a batch or flowing mode in the fluorination step.

The subject invention, then, is a method for reclamation of actinides from sintered oxide waste materials and scraps containing these elements, utilizing the fluorinating properties of $O_2F_2$. These fluorinations can be achieved at low temperatures which simultaneously improves the efficiency of the fluorination, avoids the destruction of the containment vessels and avoids the destruction of the desired actinide hexafluorides formed as a result of the fluorination process.

DETAILED DESCRIPTION OF THE INVENTION

Reference will now be made in detail to the present preferred embodiments of the invention, which are illustrated in the accompanying examples.

EXAMPLE 1

Reaction of $O_2F_2$ with $PuO_2$: A 10 mg sample of $PuO_2$ (previously fired at 450°–500° C.) was treated at room temperature with a stream of $O_2F_2$ gas for about 30 minutes (total gas pressure in the sample tube was maintained below 10 torr). The solid material remaining in the reaction tube after the gaseous material was removed represented only about 15% of the original plutonium in an unvolatilized form.

EXAMPLE 2

Recovery of plutonium from waste materials: A 54 mg sample of highly impure incinerator ash containing 39 weight percent Pu in the form of plutonium oxide was treated with an $O_2F_2$ gas stream for about one hour at room temperature. Modest plutonium volatilization was observed. However, when a second ash sample was first treated with $ClF_3$ to convert the oxides to fluorides, followed by exposure to an $HF/O_2F_2$ solution at −78° C. for about 40 minutes, only approximately 31% of the original plutonium remained in the solid phase after removal of volatiles. Of significance is the fact that the unvolatilized plutonium was rendered readily soluble in 8M nitric acid by the above-described fluorination procedure.

Examples 1 and 2 demonstrate the feasibility of the utilization of $O_2F_2$ for the recovery of plutonium and other actinides from refractory and highly impure oxides. Actinide elements in metallic and oxide form are often found in nuclear waste and scrap materials. No known reagent other than F-atoms is capable of actinide hexafluoride generation at the low temperatures employed in the above-described examples. Moreover, the successful fluorination of the plutonium oxide in sintered form by low temperature $O_2F_2$ suggests that the fluorination process would work for other actinides as well.

Example 2 shows that cryogenic solutions or suspensions of $O_2F_2$ in HF are useful for generating $PuF_6$ from impure $PuO_2$. It should be noted that $PuF_6$ was not generated from the pretreatment of the sample with $ClF_3$. Moreover, the combination of a $ClF_3$ treatment step followed by use of $O_2F_2$ produced $PuF_6$ and residual acid-soluble plutonium compounds.

A molecular species such as $O_2F_2$ would be expected to survive longer and thereby be more useful in delivering F-atoms to a distant surface to be fluorinated than F-atoms themselves. For example, at least 75% of the $O_2F_2$ was shown to survive passage through 6 feet of stainless steel tubing at ambient temperature.

In summary, the potency of $O_2F_2$ as an oxidative fluorinating agent allows reactions to be run at low temperatures, thereby avoiding many of the problems of other volatilization processes for plutonium recovery from spent fuel oxides. Moreover, despite its short lifetime at ambient temperature, $O_2F_2$ can be delivered effectively to relatively remote locations and thus has important applications for plutonium recovery from processing vessels. Furthermore, the lifetime of $O_2F_2$ at $-78°$ C. is several hours, thus allowing long contact times to be conveniently obtained. Our investigations have shown that the use of a solvent is beneficial. The experiments set forth hereinabove then demonstrate that the room temperature or below use of $O_2F_2$ will be highly beneficial for retrieval of actinides from reprocessing equipment and scrap in the form of the volatile hexafluorides of the actinides present therein or as soluble compounds thereof.

The foregoing description of two preferred embodiments of the invention have been presented for purposes of illustration and description. They are not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What we claim is:

1. A method for the recovery of plutonium as $PuF_6$ from oxides of plutonium, which comprises the steps of:
   a. contacting the oxide material with $O_2F_2$ at temperatures below approximately 25° C. for a sufficient period of time for substantial generation of $PuF_6$ to occur; and
   b. collecting the generated $PuF_6$.

2. The method as described in claim 1, wherein said $O_2F_2$ contacting step is conducted between about $-80°$ C. and 25° C., whereby deterioration of the reactant containment vessel is substantially reduced.

3. A method for the recovery of plutonium as $PuF_6$ from oxides of plutonium, which comprises the steps of:
   a. contacting the oxide material with a fluorinating agent which consists essentially of $O_2F_2$ at temperatures below approximately 25° C. for a sufficient period of time for substantial generation of $PuF_6$ to occur; and
   b. collecting the generated $PuF_6$.

4. A method for the recovery of plutonium as $PuF_6$ from oxides of plutonium, which comprises the steps of:
   a. contacting the oxide material with flowing $O_2F_2$, thereby generating $PuF_6$; and
   b. collecting the generated $PuF_6$.

5. A method for the recovery of actinides present in oxides thereof, which comprises the steps of:
   a. contacting the oxide material with $O_2F_2$ at temperatures below approximately 25° C. for a sufficient period of time for substantial generation of the hexafluorides of the actinides to occur; and
   b. collecting the generated actinide hexafluorides.

6. The method as described in claim 5, wherein said $O_2F_2$ is included in a cryogenic suspension with HF.

7. The method as described in claim 5, wherein the oxide material is first contacted with $ClF_3$ before said contacting with $O_2F_2$, whereby acid-soluble actinide compounds are produced in addition to said actinide hexafluorides.

* * * * *